US009813542B1

(12) United States Patent
Shan et al.

(10) Patent No.: US 9,813,542 B1
(45) Date of Patent: Nov. 7, 2017

(54) ADAPTIVE VIRTUALIZATION OF A NETWORKED-RESOURCE BETWEEN A VEHICLE AND A PERIPHERAL DEVICE

(71) Applicant: GM Global Technology Operations LLC, Detroit, MI (US)

(72) Inventors: Dan Shan, Troy, MI (US); Fan Bai, Ann Arbor, MI (US); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/159,375

(22) Filed: May 19, 2016

(51) Int. Cl.
*H04B 1/38* (2015.01)
*H04M 1/725* (2006.01)
*H04B 1/3822* (2015.01)
*H04L 29/08* (2006.01)
*H04W 76/02* (2009.01)
*H04W 4/00* (2009.01)
*G10L 15/26* (2006.01)
*G06F 17/28* (2006.01)

(52) U.S. Cl.
CPC ........ *H04M 1/72533* (2013.01); *G06F 17/28* (2013.01); *G10L 15/26* (2013.01); *H04B 1/3822* (2013.01); *H04L 67/303* (2013.01); *H04W 4/005* (2013.01); *H04W 76/02* (2013.01)

(58) Field of Classification Search
None
See application file for complete search history.

(56) References Cited

U.S. PATENT DOCUMENTS

| 9,083,581 B1* | 7/2015 | Addepalli | H04W 4/046 |
| 2015/0210287 A1* | 7/2015 | Penilla | B60W 40/08 701/49 |
| 2016/0070533 A1* | 3/2016 | Foster | G06F 3/167 704/275 |

* cited by examiner

*Primary Examiner* — Idowu O Osifade
(74) *Attorney, Agent, or Firm* — Mickki D. Murray; Parks IP Law LLC (57) ABSTRACT

A transportation-vehicle system including a processing hardware unit and a non-transitory computer-readable storage device comprising code causing the processing hardware unit to receive, from a mobile-electronic device, a mobile-device resource profile indicating a mobile-device resource, determine whether to use the mobile-device resource, and use the mobile-device resource in operation of the transportation-vehicle system. In another aspect, the technology relates to a mobile-electronic device including a non-transitory computer-readable storage device comprising code causing the processing unit to receive, from a transportation-vehicle system, a vehicle resource profile indicating a vehicle resource, determine whether to use the vehicle resource, and use the vehicle resource of the transportation-vehicle system in operation of the mobile-electronic device.

20 Claims, 6 Drawing Sheets

Fig. 2

Fig_3

Fig_4

FIG_5

FIG_6

Fig_7

Fig_8

ADAPTIVE VIRTUALIZATION OF A NETWORKED-RESOURCE BETWEEN A VEHICLE AND A PERIPHERAL DEVICE

TECHNICAL FIELD

The present disclosure relates generally to adaptive resource sharing amongst connected devices and, more particularly, to systems and processes for dynamically sharing resources amongst devices including an on-board computer of a vehicle of transportation and networked personal or after-market electronic devices.

BACKGROUND

This section provides background information related to the present disclosure which is not necessarily prior art.

Modern vehicles are equipped with numerous sensing resources. Examples sensors include accelerometers, sensors, RADAR, LiDAR, and biometric sensors, to name just a few.

In recent years, there has also been a proliferation of personal or mobile computing devices, such as smartphones, wearables (e.g., smartwatch), and mass-storage devices such as USB plug-ins.

Personal devices can be connected to a vehicle for providing to the vehicle media or communication data, such as audio data from a music app operating at the personal device, or phone book data, or real-time call audio data, from a telephone app at the personal device.

Because these devices are not part of the vehicle as originally manufactured, the devices can be referred to as aftermarket devices.

The vehicle and the various personal devices have different native resources. While the vehicle may have sophisticated and robust RADAR and biometric sensors, for instance, a user smartphone may have a more-advanced camera, or a camera that can be directed in a direction distinct from any vehicle camera.

SUMMARY

There is a need for systems and processes capable of intelligently leveraging sensor resources amongst the vehicle and any personal device(s) based on the circumstances.

In one aspect, the present technology includes a transportation-vehicle system including a processing hardware unit and a non-transitory computer-readable storage device including code that, when executed by the processing hardware unit, causes the processing hardware unit to perform various operations.

The operations include receiving, from a mobile-electronic device, a mobile-device resource profile indicating a mobile-device resource, and determining whether to use the mobile-device resource. The operations further include utilizing, in response to determining to use the mobile-device resource, the mobile-device resource in operation of the transportation-vehicle system.

In various embodiments, the code, when executed by the processing hardware unit, causes the processing hardware unit to, in response to determining to use the mobile-device resource of the mobile-electronic device, send a work request to the mobile-electronic device requesting agreement for the transportation-vehicle system to use the mobile-device resource.

The code, when executed by the processing hardware unit, in some implementations causes the processing hardware unit to receive a commitment communication from the mobile-electronic device responding to the work request; and utilizing the mobile-device resource of the mobile-electronic device is performed in response to receiving the commitment communication.

In various embodiments, determining whether to use the mobile-device resource includes performing a weighted utility function comparing utility of multiple optional resources.

The code, when executed by the processing hardware unit, in some implementations causes the processing hardware unit to, based on the mobile-device resource profile, generate or modify a networked-device table outlining one or more available resources of one or more devices networked with the transportation-vehicle system.

At least one of the optional resources can be represented in the networked-device table, and at least one of the optional resources is a system resource, the system resource being a resource of the transportation-vehicle system or part of an apparatus including the transportation-vehicle system.

In various implementations, the code includes an application being or to be executed at the transportation-vehicle system, and utilizing the mobile-device resource of the mobile-electronic device in operation of the transportation-vehicle system includes utilizing the mobile-device resource in execution of the application at the transportation-vehicle system.

In some cases, the code includes a networked-device client configured specially to communicate with a networked-device server of the mobile-electronic device for at least transmitting, between the transportation-vehicle system and the mobile-electronic device, data related to operation of the mobile-device resource in operation of the transportation-vehicle system.

The mobile-device resource can include a mobile-device sensor, and utilizing the mobile-device resource of the mobile-electronic device in operation of the transportation-vehicle system includes sending a system message to the mobile-electronic device for processing using the mobile-device resource or service.

In various embodiments, the sensor is selected from a list consisting of: a camera, an accelerometer, an altimeter, a bio-metric sensor, RADAR, LiDAR, position- or pose-determination sensor, a speed sensor, a height sensor, a weight or payload sensor, and a weather-related sensor.

The mobile-device resource can include a mobile-device resource or service, and the mobile-device resource of the mobile-electronic device in operation of the transportation-vehicle system includes sending a system message to the mobile-electronic device for processing using the mobile-device resource or service.

In various embodiments, the mobile-device resource includes components configured to provide a natural-language-processing service.

The mobile-device resource can include a mobile-device output component, and utilizing the mobile-device resource of the mobile-electronic device in operation of the transportation-vehicle system can include sending a system message to the mobile-electronic device for output from the mobile-device output component.

In another aspect the technology includes a mobile-electronic device including a processing hardware unit and a non-transitory computer-readable storage device including code that, when executed by the processing hardware unit, causes the processing hardware unit to receive, from a transportation-vehicle system, a vehicle resource profile indicating a vehicle resource, determining whether to use the vehicle resource, and utilizing, in response to determining to use the vehicle resource, the vehicle resource of the transportation-vehicle system in operation of the mobile-electronic device.

In various embodiments, the determining whether to use the vehicle resource includes performing a weighted utility function comparing utility of multiple optional resources.

The technology in various embodiments implements any of:

a. a flexible architecture for device arbitration and virtualization;
b. a pre-determined data/control interface for inter-device compatibility (allowing future compatibility between even devices to be determined and configured with appropriate interface components);
c. a virtualization mechanisms, such as an operating-system level kernel, a middleware module, and a communication arrangement such as wireless-USB or virtualized-Ethernet components.

Other aspects of the present technology will be in part apparent and in part pointed out hereinafter.

DESCRIPTION OF THE DRAWINGS

The figures are not necessarily to scale and some features may be exaggerated or minimized, such as to show details of particular components.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

In some instances, well-known components, systems, materials or processes have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. Technology Introduction

The present disclosure describes, by various embodiments, systems, including computing and sensor hardware, underlying software coded with customized algorithms, for dynamically sharing resources amongst devices.

While the resources described primarily herein as being shared include various types of sensors, such as accelerometers, velocity or speed sensors, cameras, etc., the resources shared can also include a service or software, such as a natural-language-processing (NLP; or voice-to-text) component or any of various processing functions (e.g., CPU and GPU functions). And in various embodiments, the resource includes an output component, such as a camera flash, the CPU and GPU mentioned, or a speaker component.

While select examples describe implementation of the present technology with automobiles, the technology is not limited by the focus. The concepts can be extended to a wide variety of systems and devices, such as sensing and computing devices of other transportation or moving vehicles including aircraft, watercraft, manufacturing equipment (for example, forklift), trucking, bussing, construction machines, and agricultural machinery, or of warehouse equipment, devices at the office, home appliances, personal or mobile computing devices, such as phones, wearables, plug-ins, and wireless peripherals, the like, and other.

II. Host Vehicle—FIG. 1

Figure 1:
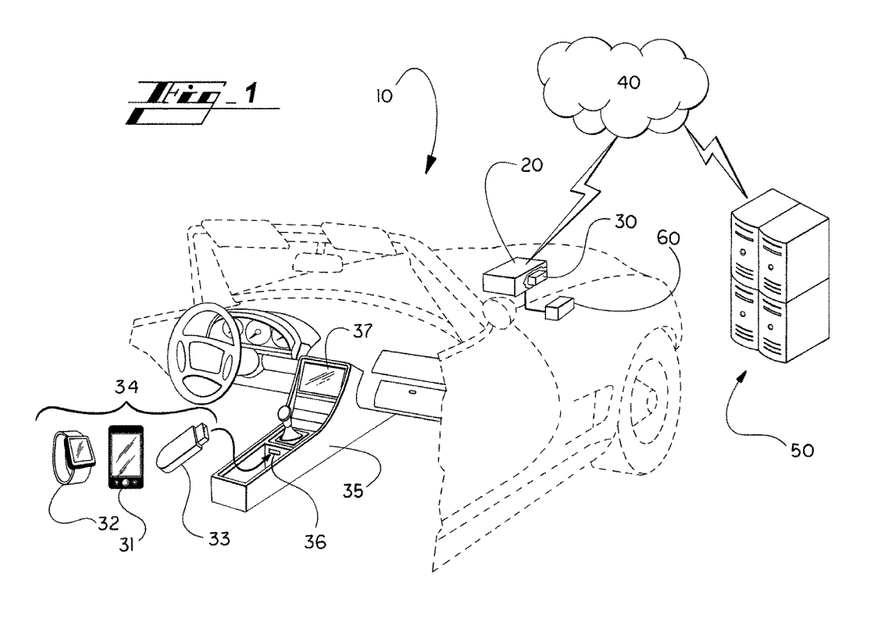
FIG. 1 illustrates schematically an example vehicle of transportation and local personal computing devices according to embodiments of the present technology.

Turning now to the figures and more particularly the first figure, FIG. 1 shows an example host structure or apparatus 10 in the form of a vehicle, and particularly an automobile simply by way of example.

The vehicle 10 includes a hardware-based controller or controlling system 20. The hardware-based controlling system 20 includes a communication sub-system 30 for communicating with local computing devices 34 as well as external networks 40.

By the external networks 40, such as the Internet, a local-area-network, a cellular or satellite network, vehicle to vehicle or other infrastructure, etc., the vehicle 10 can reach mobile, local, or remote systems 50, such as remote servers.

Example local devices include a user smartphone 31, a user wearable device 32, and a USB mass storage device 33, and are not limited to these examples. Example wearables include smart-watches, eyewear, and smart-jewelry (earrings, necklaces, lanyards, etc.).

Another example local device is an on-board device (OBD), such as a brake or rotor-wear sensor, or other vehicle state or dynamics-related sensor for the vehicle, with which the vehicle is retrofitted with after manufacture.

The vehicle 10 has mounting structure 35 including a central console and dashboard including or holding an instrument panel, a plug-in port 36—a USB port, for instance—and a visual display 37, such as a touch-sensitive, input/output, human-machine interface (HMI).

The vehicle 10 also has a sensor sub-system 60 including sensors providing information to the controlling system 20 regarding features such as vehicle operations, vehicle position, vehicle pose, user characteristics, such as biometrics or physiological measures, and environments within and outside of the vehicle 10.

III. On-Board Computing Architecture—FIG. 2

Figure 2:
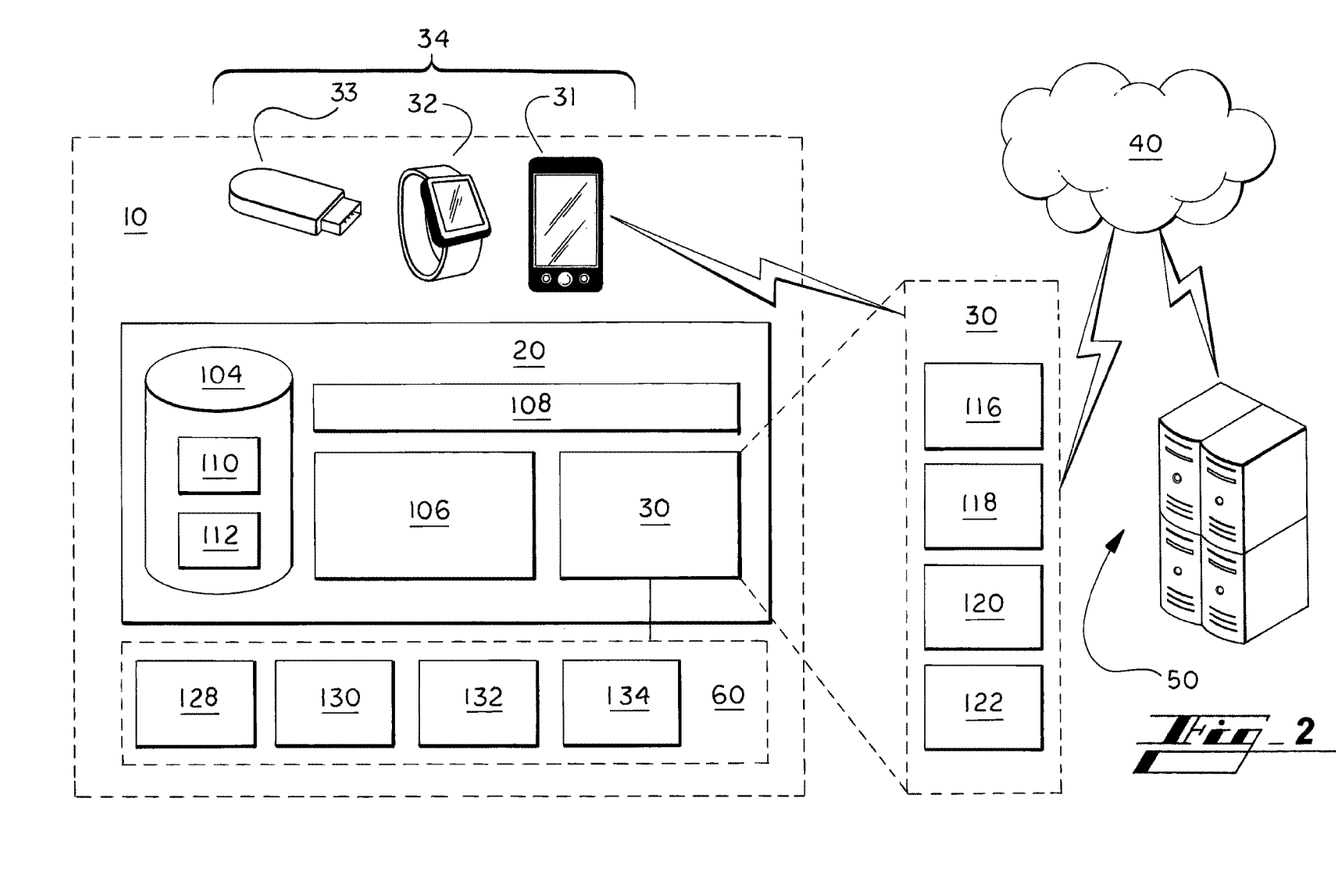
FIG. 2 illustrates schematically more details of the example vehicle computer of FIG. 1 in communication with the local and remote computing devices.

FIG. 2 illustrates in more detail the hardware-based computing or controlling system 20 of FIG. 1. The controlling system 20 can be referred to by other terms, such as computing apparatus, controller, controller apparatus, or such descriptive term. As mentioned, the controller system 20 is, in various embodiments, part of a greater system 10, such as a vehicle.

The controlling system 20 includes a hardware-based computer-readable storage medium, or data storage device 104 and a hardware-based processing unit 106. The processing unit 106 is connected or connectable to the computer-readable storage device 104 by way of a communication link 108, such as a computer bus or wireless components.

The processing unit 106 can be referenced by other names, such as processor, processing hardware unit, the like, or other.

The processing unit 106 can include or be multiple processors, which could include distributed processors or parallel processors in a single machine or multiple machines. The processing unit 106 can be used in supporting a virtual processing environment.

The processing unit 106 could include a state machine, application specific integrated circuit (ASIC), programmable gate array (PGA) including a Field PGA, CPU, or GPU. References herein to the processing unit executing code or instructions to perform operations, acts, tasks, functions, steps, or the like, could include the processing unit performing the operations directly and/or facilitating, directing, or cooperating with another device or component to perform the operations.

In various embodiments, the data storage device 104 is any of a volatile medium, a non-volatile medium, a removable medium, and a non-removable medium.

The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The data storage device 104 includes one or more storage modules 110 storing computer-readable code or instructions executable by the processing unit 106 to perform the functions of the controlling system 20 described herein. The modules and functions are described further below in connection with FIG. 3.

The data storage device 104 in some embodiments also includes ancillary or supporting components 112, such as additional software and/or data supporting performance of the processes of the present disclosure, such as one or more user profiles or a group of default and/or user-set preferences.

As provided, the controlling system 20 also includes a communication sub-system 30 for communicating with local and external devices and networks 34, 40, 50. The communication sub-system 30 in various embodiments includes any of a wire-based input/output (i/o) 116, at least one long-range wireless transceiver 118, and one or more short- and/or medium-range wireless transceivers 120. Component 122 is shown by way of example to emphasize that the system can be configured to accommodate one or more other types of wired or wireless communications.

The long-range transceiver 118 is in some embodiments configured to facilitate communications between the controlling system 20 and a satellite and/or a cellular telecommunications network, which can be considered also indicated schematically by reference numeral 40.

The short- or medium-range transceiver 120 is configured to facilitate short- or medium-range communications, such as communications with other vehicles, in vehicle-to-vehicle (V2V) communications, and communications with transportation system infrastructure (V2I). Broadly, vehicle-to-entity (V2X) can refer to short-range communications with any type of external entity (for example, devices associated with pedestrians or cyclists, etc.).

To communicate V2V, V2I, or with other extra-vehicle devices, such as local communication routers, etc., the short- or medium-range communication transceiver 120 may be configured to communicate by way of one or more short- or medium-range communication protocols. Example protocols include Dedicated Short-Range Communications (DSRC), WI-FI®, BLUETOOTH®, infrared, infrared data association (IRDA), near field communications (NFC), the like, or improvements thereof (WI-FI is a registered trademark of WI-FI Alliance, of Austin, Tex.; BLUETOOTH is a registered trademark of Bluetooth SIG, Inc., of Bellevue, Wash.).

By short-, medium-, and/or long-range wireless communications, the controlling system 20 can, by operation of the processor 106, send and receive information, such as in the form of messages or packetized data, to and from the communication network(s) 40.

Remote computing devices 50 with which the sub-system 30 communicates are in various embodiments nearby the vehicle 10, remote to the vehicle, or both.

The remote devices 50 are configured with any suitable structure for performing the operations described herein. Example structure includes any or all structures like those described in connection with the vehicle computing device 20. A remote device 50 includes, for instance, a processing unit, a storage medium including modules, a communication bus, and an input/output communication structure. These features are considered shown for the remote device 50 by FIG. 1 and the cross-reference provided by this paragraph.

While local devices 34 are shown within the vehicle 10 in FIGS. 1 and 2, any of them may be external to the vehicle and in communication with the vehicle.

Example remote systems 50 include a remote server (for example, application server), or a remote data, customer-service, and/or control center. A user computing or electronic device 34, such as a smartphone, can also be remote to the vehicle 10, and in communication with the sub-system 30, such as by way of the Internet or other communication network 40.

An example control center is the OnStar® control center, having facilities for interacting with vehicles and users, whether by way of the vehicle or otherwise (for example, mobile phone) by way of long-range communications, such as satellite or cellular communications. ONSTAR is a registered trademark of the OnStar Corporation, which is a subsidiary of the General Motors Company.

As mentioned, the vehicle 10 also includes a sensor sub-system 60 including sensors providing information to the controlling system 20 regarding items such as vehicle operations, vehicle position, vehicle pose, user characteristics, such as biometrics or physiological measures, and/or the environment about the vehicle 10. The arrangement can be configured so that the controlling system 20 communicates with, or at least receives signals from sensors of the sensor sub-system 60, via wired or short-range wireless communication links 116, 120.

In various embodiments, the sensor sub-system 60 includes at least one camera 128 and at least one range sensor 130, such as radar or sonar. The camera 128 may include a monocular forward-looking camera, such as those used in lane-departure-warning (LDW) systems. Other embodiments may include other camera technologies, such as a stereo camera or a trifocal camera.

Sensors configured to sense external conditions may be arranged or oriented in any of a variety of directions without departing from the scope of the present disclosure. For example, the cameras 128 and the range sensor 130 may be oriented at each, or a select, position of, (i) facing forward from a front center point of the vehicle 10, (ii) facing rearward from a rear center point of the vehicle 10, (iii) facing laterally of the vehicle from a side position of the vehicle 10, and/or (iv) between these directions, and each at or toward any elevation, for example.

The range sensor 130 may include a short-range radar (SRR), an ultrasonic sensor, a long-range radar, such as those used in autonomous or adaptive-cruise-control (ACC) systems, sonar, or a Light Detection And Ranging (LiDAR) sensor, for example.

Other example sensor sub-systems 60 include an inertial-momentum unit (IMU) 132, such as one having one or more accelerometers, and/or other dynamic vehicle sensors 134, such as a wheel sensor or a sensor associated with a steering system (for example, steering wheel) of the vehicle 10.

The sensors 60 can include any sensor for measuring a vehicle pose or other dynamics, such as position, speed, acceleration, or height—e.g., vehicle height sensor.

The sensors 60 can include any known sensor for measuring an environment of the vehicle, including those mentioned above, and others such as a precipitation sensor for detecting whether and how much it is raining or snowing, a temperature sensor, precipitation or other weather-related sensor, and any other.

Sensors 60 for sensing user characteristics include any biometric sensor (salinity, heartrate, retina or other eye scanner or sensor, blood pressure, breath-quality sensors (e.g., breathalyzer)), camera, microphone associated with a voice recognition sub-system, a driver-, passenger-, or pay-load-weight sensor, a vehicle-height sensor, and a temperature, precipitation or other weather-related sensor, or other.

User-vehicle interfaces, such as a touch screen display 37, buttons, knobs, the like, or other can also be considered part of the sensor sub-system 60.

IV. Additional Vehicle Computing Structures—FIG. 3

Figure 3:
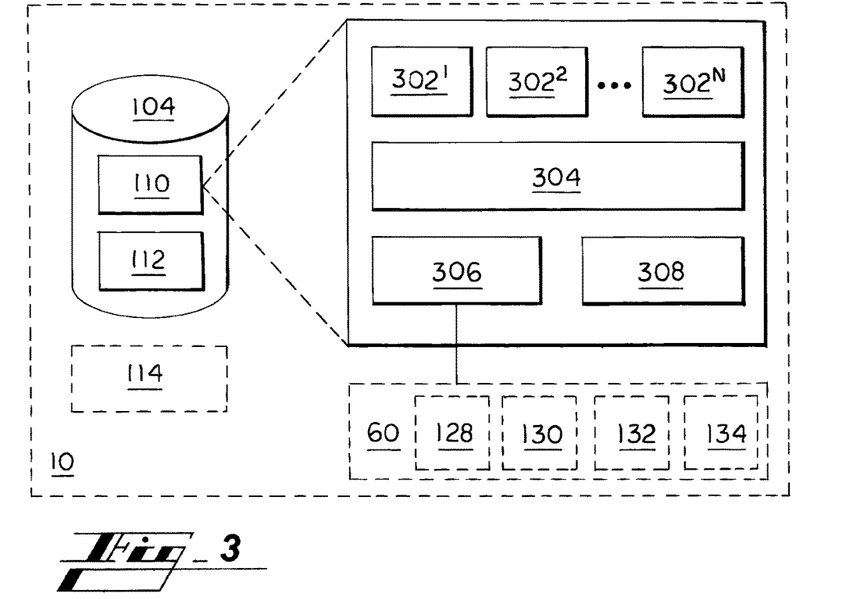
FIG. 3 shows an alternative view of the vehicle of FIGS. 1 and 2 emphasizing example memory components.

FIG. 3 shows an alternative view of components of the vehicle 10 of FIGS. 1 and 2 emphasizing example memory components.

As mentioned, the data storage device 104 includes one or more modules 110 and may include ancillary components 112, such as additional software and/or data supporting performance of the processes of the present disclosure. The ancillary components 112 can include, for example, additional software and/or data supporting performance of the processes of the present disclosure, such as one or more user profiles or a group of default and/or user-set preferences.

Example modules 110 shown include:
One or more applications $302^1$, $302^2$, ... $302^N$;
An operating system and device drivers 304;
An input, or input/output, component 306 for communication with peripherals or other apparatus beyond the computing system 20; and
a customized networked-resource client and/or networked-resource server 308—the component can be referred to more generically as a networked-resource engine, whether it includes client and/or server capabilities.

Regarding the client/server component 308, in various embodiments, the component 308 includes or is operationally connected with a module or sub-module of a dynamic programming language. Example DPL includes such as JavaScript, Java or a C/C++ programming language. Devices with which the vehicle computing device 20 interacts for executing functions of the present technology include corresponding DPL module or sub-module for use in inter-device communications—e.g., between each personal device 34 and the vehicle 10 or another personal device. The module in some implementations includes an application framework, such as from a media or entertainment application, a security-related application, a navigation, traffic or weather application, another application of the host device, and/or an application manager for managing operations of any such application at the host device. DPL code in various embodiments defines settings for communications between respective devices, such as parameters of one or more application program interfaces (APIs) by which the devices will communicate.

The networked-device engines and/or DPL arrangement(s) facilitate what can be referred to as device arbitration. With personal, mobile, or aftermarket electronic devices 31, 32, 33, though having their own processors and operating systems, behaving as respective peripherals of the vehicle system 10, the networked devices (e.g., vehicle system 20 and plug-in system 220) inter-operate seamlessly. In some implementations, the seamless operation is executed in a manner substantially similar (e.g., processing speed, resource use, etc.) as if the device borrowing use of, or virtualizing, the resource, had the resource natively.

Any of the code or instructions described can be part of more than one module. And any functions described herein can be performed by execution of instructions in one or more modules, though the functions may be described primarily in connection with one module by way of primary example. Each of the modules can be referred to by any of a variety of names, such as by a term or phrase indicative of its function.

V. Other-Device Computing Structures—FIGS. 4-6

Figure 4:
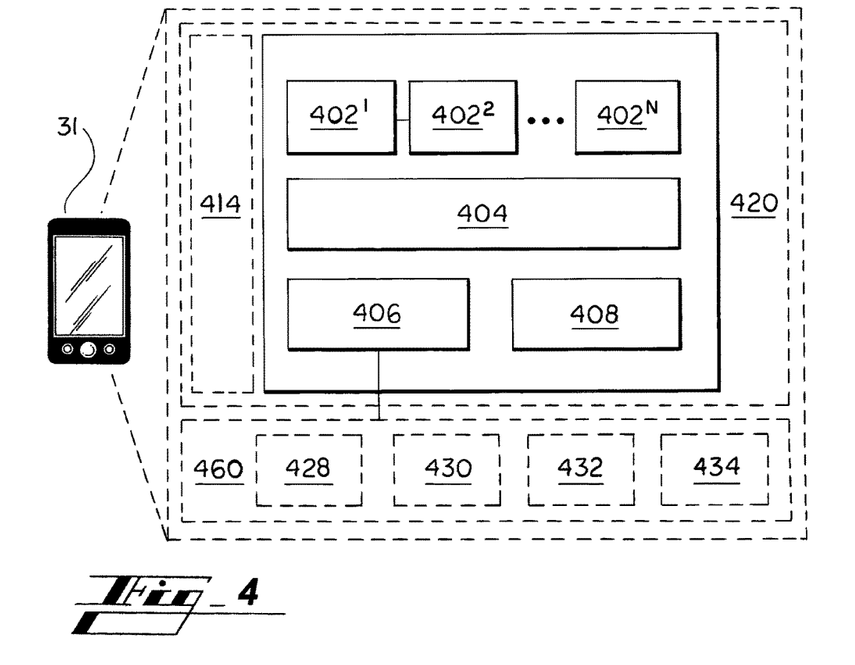
FIG. 4 illustrates schematically components of a first personal computing device being, by way of example, a user smartphone.
Figure 5:
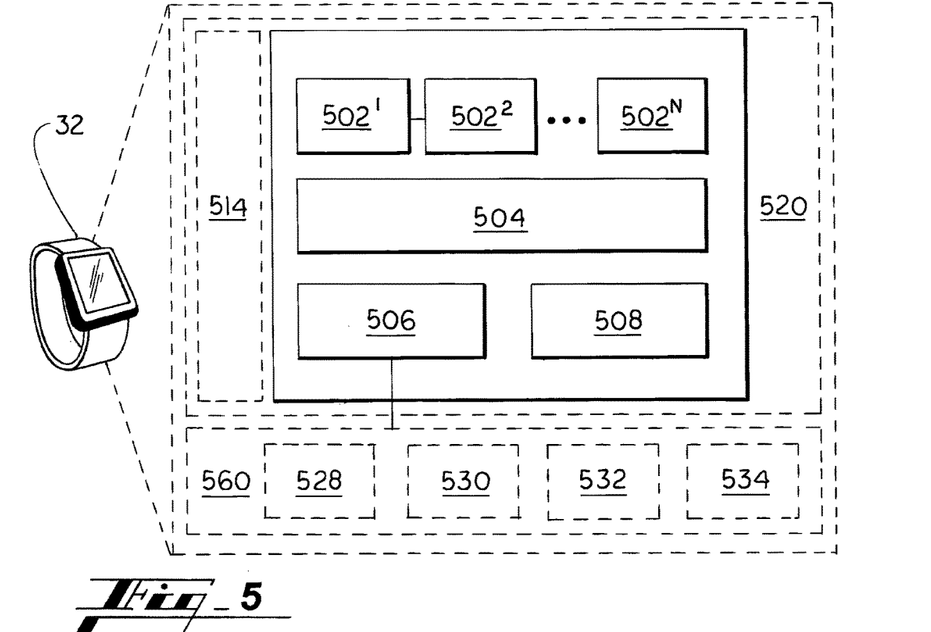
FIG. 5 illustrates schematically components of a second personal computing device being, by way of example, a smartwatch.
Figure 6:
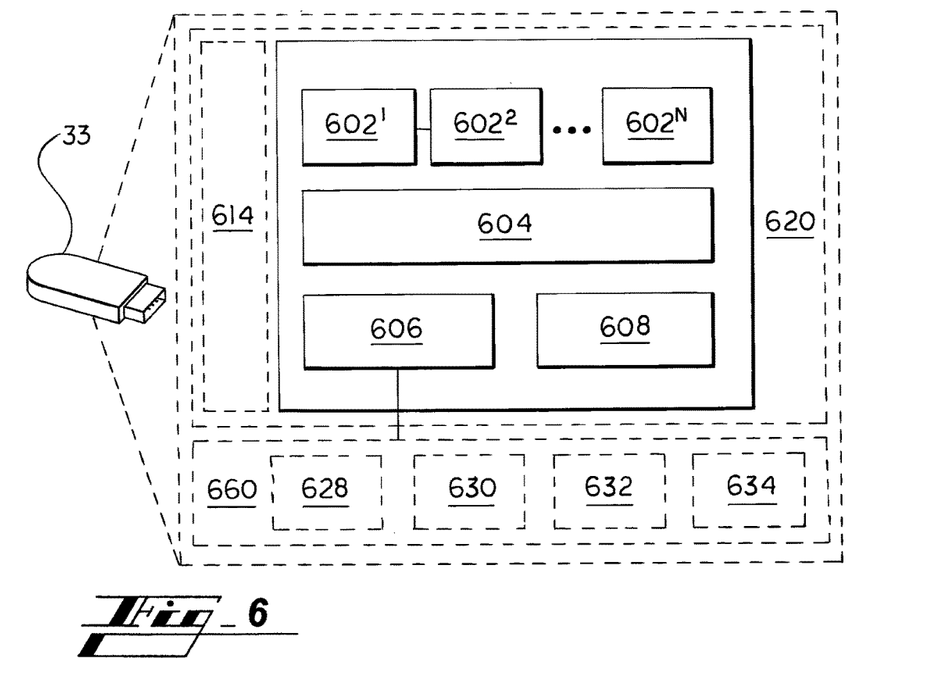
FIG. 6 illustrates schematically components of a third personal computing device being, by way of example, a mass storage device, and particularly a universal-serial-bus (USB) mass storage device.

FIGS. 4-6 show example components of the personal computing devices 34.

The personal computing devices 34 are configured with any suitable structure for performing the operations described for them. Example structure includes any of the structures described in connection with the vehicle computing device 20.

With reference to FIGS. 4-6, for instance, the example user smartphone 31, wearable device 32, and USB mass storage device 33 are shown to include, in addition to any analogous features to those shown in FIG. 1 for the vehicle computing system 20, respectively:

Applications $402^1$, $402^2$, ... $402N/502^1$, $502^2$, ... $502N/602^1$, $602^2$, ... $602N$;

An operating system and device drivers 404/504/604;

An input, or input/output, component 406/506/606 for communication with peripherals or other apparatus beyond the device computing system 420/520/620; and a customized networked-resource client and/or networked-resource server 408/508/608.

And the user smartphone 31, wearable device 32, and USB mass storage device 33 can include respective sensor sub-systems 460/560/660. Example sensors are indicated by:

428, 430, 432, 434 for the first example aftermarket device 32;

528, 530, 532, 534 for the second example aftermarket device 32; and 628, 630, 632, 634 for the third example aftermarket device 33.

The aftermarket device sensors can include any available sensor for aftermarket, personal, or mobile devices. Example sensors include but are not limited to cameras, accelerometers, velocity or speed sensors, biometric sensors (e.g., salinity sensor, heartrate, blood pressure, alcohol level, retina scanner, etc.), altitude sensors, light or light-level sensors, touch-sensitive component (e.g., capacitive screen), buttons, switches, other actuators, microphone, navigation components (e.g., GPS receiver and processing components, or a triangulation component), or any other available sensor for aftermarket, personal, or mobile devices.

Any sensor can include or be in communication with a supporting program, which can be considered illustrated by the sensor icon, or by data structures such as one of the applications 402N, 502N, 602N. As an example, an aftermarket device can include a natural-language-processing (NLP) component, which can include or be associated with a microphone. The NLP component with the microphone can be considered a sensor of the host aftermarket device (e.g., USB mass storage 33).

As mentioned, while the resources described primarily herein as being shared include various types of sensors, such as accelerometers, velocity or speed sensors, cameras, etc., the resource shared can also include a service or software, such as a natural-language-processing (NLP; or voice-to-text) component or any of various processing functions (e.g., CPU functions), and an output component, such as a camera flash, or the CPU mentioned, or a speaker component.

In a contemplated embodiment, a first device (e.g., the vehicle 10) sends data representing audio sensed at the first, to a second device (e.g., the mass storage 33), which performs NLP and returns text or language data to the first device. The NLP can be considered—e.g., for the claims of the present application—to be a sensor of the second device, which is virtualized according to the present technology for purposes of the first device. Similarly, the second device could include gesture-recognition component that used camera or other visual-related data (e.g., RADAR, LiDAR) from the second device and/or from the first device.

In various embodiments, a first device uses a component of another of the devices for providing output generated at the second device. As an example, an aftermarket wearable device as the first device can provide audio data to the vehicle system 20 or smartphone system 420 to provide output to the user via a speaker of the vehicle system 20 or smartphone 31. As mentioned, example wearables include smart-watches, eyewear, and smart-jewelry (earrings, necklaces, lanyards, etc.).

Regarding the client/server arrangements of the subject apparatus 20, 420, 520, 620, for inter-communications between any of the apparatus, the client and/or server component 306/406/506/606 can include components for operating selectively as a client or a server, depending on the situation. If the user smartphone 31 is using data from a sensor 60 of the vehicle 10, as a virtual sensor for the smartphone 31, then the networked virtualization component 306 of the vehicle 10 acts in a server capacity while the networked virtualization component 406 of the smartphone acts as in a client capacity.

When on the other hand, the vehicle 10 is using data from a sensor 360 of the user smartphone 31, as a virtual sensor for the vehicle 10, then the networked virtualization component 406 of the phone 31 acts in a server capacity while the networked virtualization component 306 of the vehicle 10 acts as in a client capacity.

Similar relationships in various implementations are present between any relevant computing apparatus, including but not limited to the example apparatus 20, 420, 520, 620 illustrated and described.

VI. Inter-Device Communications—FIG. 7

Figure 7:
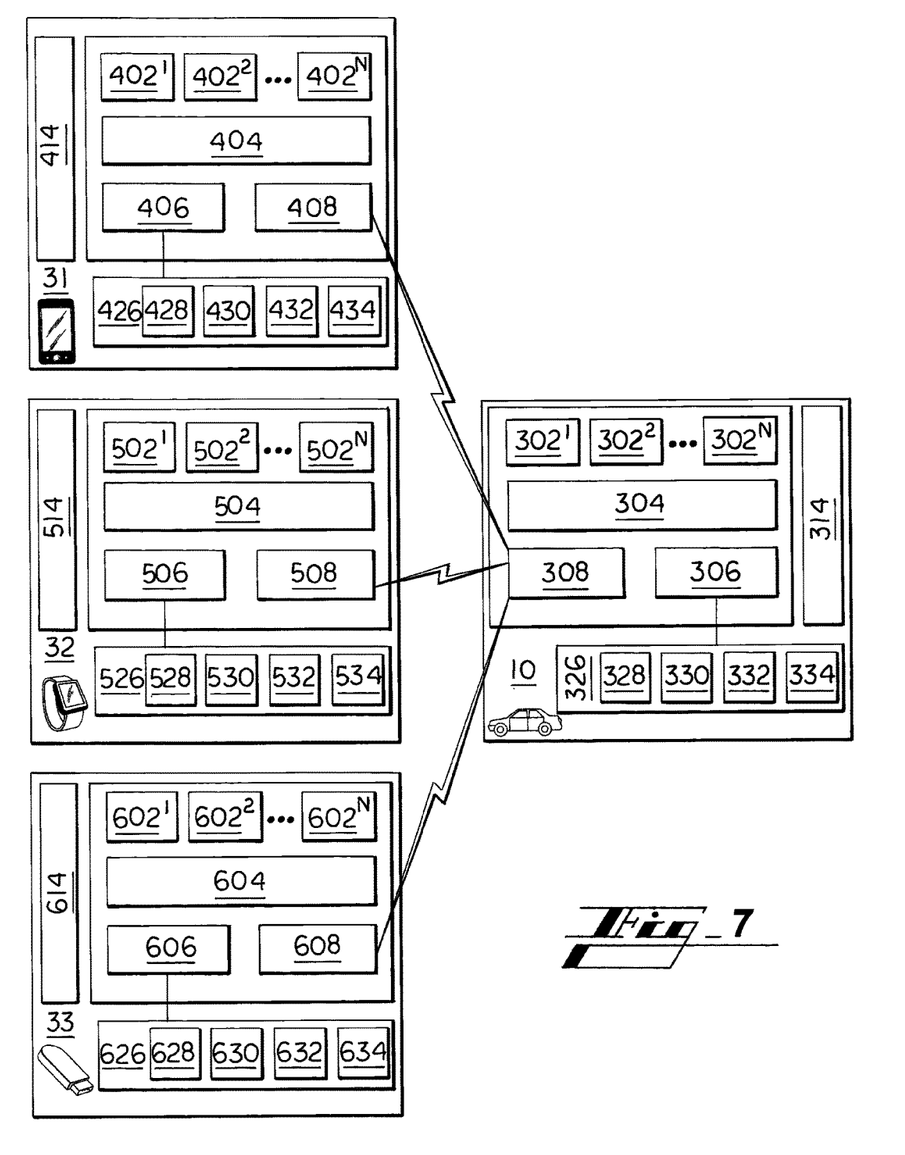
FIG. 7 shows the example apparatus of FIGS. 3-6 in communication for performing functions of the present technology.

FIG. 7 shows the example apparatus of FIGS. 3-6 in communication for performing functions of the present technology.

The figure shows each of the personal, mobile, or aftermarket devices 31, 32, 33 in communication with the vehicle system 10 for executing the inventive functions described.

While the personal, mobile, or aftermarket electronic or computing devices 34 are referred to primarily below as mobile devices for simplicity, the devices are not limited to a particularly level or range of mobility. It is possible that a user connect or affix the device 34 to the vehicle 10 for instance. The 'aftermarket' moniker refers to the characteristic of the device 34 not being a part of the vehicle 10 as originally manufactured.

A dynamic driver of a first device, such as a dynamic USB driver, communicates with a driver of a second device, such as a vehicle peripheral driver, middleware or application. The communication in various implementations occurs automatically and can use an optimal or custom virtualization routine or method particular to the subject peripheral(s) and other components involved.

In various embodiments of the arrangement, the mobile devices 31, 32, 33, though having their own processors and operating systems, behave as respective peripherals of the vehicle system 10.

Any of the mobile devices can also interact with each other, in a client/server relationship according to the present disclosure. These communications too can be by wire or wireless, and are indicated schematically by lines linking the mobile devices.

As an example, a dynamic USB driver of an mobile device 34 can communicate with an application of a vehicle device 20, such as via respective networked-device engines of the devices—e.g., networked-device server 408, 508, or 608 of the AMD 33, and networked-device client 308 of the vehicle device 20. In the communication, the USB driver passes along data from AMD resources, effectively virtualizing the AMD-resource for the vehicle system 20. Example ADM resources, e.g., USB resources, include:
1. a USB network adapter to enable socket programming;
2. USB camera;
3. USB mic and/or speaker; and
4. Hardware and/or Software Resources.

VII. Algorithms and Processes—FIG. 8

Figure 8:
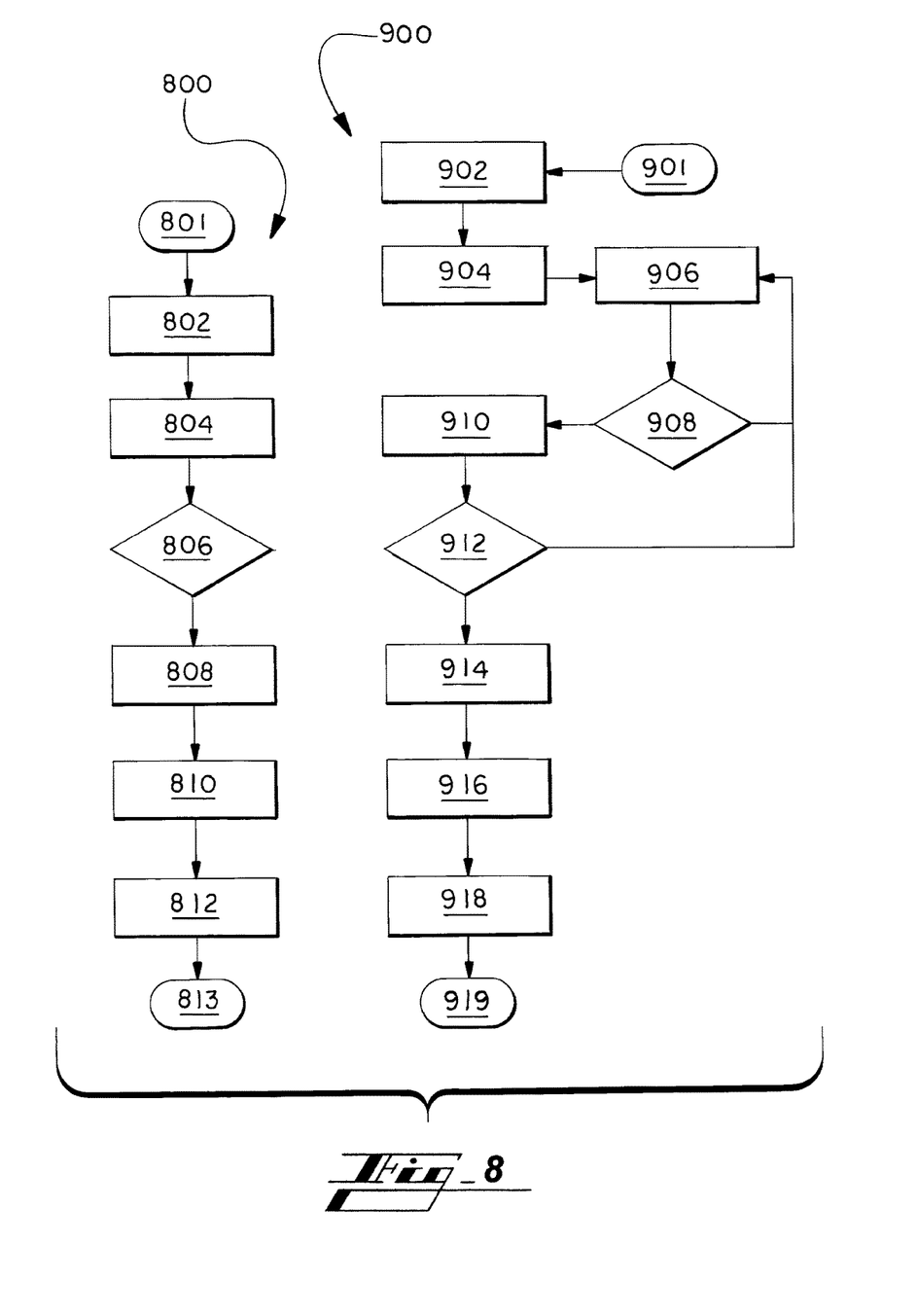
FIG. 8 shows schematically example operation flows, performed according to novel algorithms and protocols of the present technology.

FIG. 8 shows schematically example operation flows, performed according to novel algorithms, routines, and protocols of the present technology.

FIG. 8 shows example algorithms, represented schematically by process flows 800, 900, according to embodiments of the present technology. Though only these process flows are shown for simplicity, any of the functions or operations can be performed in one or more or processes, routines, or sub-routines of one or more algorithms, by one or more devices or systems.

It should be understood that the steps, operations, or functions of the processes 800, 900 are not necessarily presented in any particular order and that performance of some or all the operations in an alternative order is possible and is contemplated.

The operations have been presented in the demonstrated order for ease of description and illustration. Operations can be added, omitted and/or performed simultaneously without departing from the scope of the appended claims. It should also be understood that either of the illustrated processes 800, 900 can be ended at any time.

In certain embodiments, some or all operations of the processes 800, 900 and/or substantially equivalent operations are performed by computer processors of respective devices, such as the hardware-based processing unit 106 of the vehicle computing system 20 and processing units 414, 514, 614 of respective mobile devices 31, 32, 33, executing computer-executable instructions stored on the respective computer-readable media (e.g., storage 104) of the systems 20, 420, 520, 620.

The processes 800, 900 of FIG. 8 represent cooperating functions of interacting devices, with select interactions indicated by arrowed lines between the flows 800, 900. Any single-arrowed line can for various embodiments be replaced by a double-arrowed line, as two-way communications are possible at each stage, at least to confirm receipt of a prior communication represented by the same line.

In the example flows shown, the first process 800 represents operations of a first device, such as any mobile device 34, and the second process 900 represents operations of a second device such as the vehicle system 20. In other embodiments, the first device is a vehicle system, the second device is a mobile device, or both devices are vehicles or both devices are mobile devices. In various embodiments, three or more devices interact according to the premises provided herein, including according to the general premises outlined here with respect to FIGS. 8 and 9.

The first process 800 begins 801 and flow proceeds to block 802, whereat the processor of the first device (e.g., smartwatch 33) is powered on, activated, or changed to a relevant mode or state for performing functions of the present technology.

The second process 900 begins 901 and flow proceeds to block 902, whereat the processor of the second device is powered on, activated, or changed to a relevant mode or state for performing functions of the present technology. For the examples in which the second device is a vehicle 10, the operation 902 can include activating the vehicle by ignition switch.

At block 904, the processor of the second device begins operation of an application maintained at the second device, such as a navigation or infotainment-related app. At block 906, the application is executed.

While one application is mentioned primarily here, more than one application can be subject at the same time to the functions described—for instance, the processor of the second device can determine adaptively one or more resources of other devices to use in execution of more than one application at the second device.

At block 804, the first device provides a resource message for receipt by one or more other devices networked with the first device. The message includes at least one service and/or resource profile or announcement advising recipient devices of the resource(s) and/or service(s) that the first device has available for being used by other devices. The message can be considered a profile or announcement, and include services and/or resources, and for ease of description will be referred to primarily below as a resource announcement.

The resource announcement can indicate computing and I/O resources of the announcing, or publishing, first device. And the resource announcement can include, for consideration and interrelations with other devices, various relevant characteristics or indications related to the first device or the resources or services available at the first device for use by the other devices.

Example first-device resource characteristics can include but are not limited to:
A name of the resources/services, e.g., speaker, camera, etc.;
An identification number, code, or address corresponding to the device providing the announcement;
An identification number or code corresponding to each resource/service;
Characteristics such as capabilities of the resource, such as number of channels for a speaker, accuracy, error, precision, or reliability for a positioning component, direction(s) or area(s) to which a camera or other sensor is or can be directed;
Times or timing by which the resource is available;
First-device processing performance indicator(s)—e.g., MIPS or other speed or performance indicator for a CPU or processing component;
First-device power indicator—e.g., present or anticipated power level(s) over time, measured in mAh, for instance;
First-device storage indicator—e.g., flash drive available (measured in GB, for instance);
Type of communication protocols or connections that the first device is equipped to use—e.g., Wi-Fi, BT, USB port, USB Ethernet, etc.; and
Amount or type of data available, which data can be referred to as 'knowledge'; and
Any other limitations or factors affecting performance, use, or availability of the resource/service for other devices.

Such resource announcements can be sent or made available to and subsequently received by multiple other devices. The resource announcement can be formatted in any of a wide variety of manners, such as a table.

Regarding timing, in various embodiments, devices send, publish or make available or discoverable, their resource profile for receipt by other devices at any of various timings, such as at startup for the publishing device or for the receiving device.

At block 908, the second device (e.g., vehicle 10 or vehicle system 20) determines whether it has received any resource announcements from another device. If not, flow returns to block 906 where operation of the application is continued, with any resources already being used, such as resources native to the second device.

If the second device has received a resource announcement, flow proceeds to block 910, whereat the processor of the second device creates or updates a networked-device summary using data from the resource announcement received. The summary outlines for the second device resources available from devices networked with or able to be networked with the second device. The summary can have any of a wide variety of formats. A table format is described primarily here by way of example.

The networked-device table can include any data that may assist the second device in determining whether and how to access a resource of a networked device. Example datum include those described above as example components of the resource announcement.

At block 912, the second device determines whether to request access to a resource of a networked device. The determination can be include performing an intelligent balancing of the optional resources, such as those local to the second device and those available from networked devices. The determination in various embodiments is performed using the networked-resource client and/or networked-resource server of the subject device—engines 408, 508, 608, for instance.

In various embodiments, the balancing includes determining a utility value (U) for each resource (i=1, 2, . . . M) under consideration. While the utility value for each resource ($U_i$) can be determined in other ways, according to one technique the value ($U_i$) is determined as a weighted summary of relevant factors for the resources or resource-hosting networked devices. Example factors include, but are not limited to:

1. one or more processing, or CPU, factors (C), such as speed;
2. a flash or other memory-related characteristic (F);
3. a wired or wireless connection or protocol used by the subject networked device (W);
4. a description, indicator, or identifier corresponding to the subject sensor or other resource (S);
5. a power or battery characteristic, such as present power level (B)

Weights for the weighted summary are based on determined importance or values to be placed on the factors. Regarding the five (5) example factors above, each of the above factors is associated with a corresponding weight: w1, w2, w3, w4, w5 for determining the utility value ($U_i$), and in various embodiments the sum of weights equals 1:

$$U_i = w_1 C_i + w_2 F_i + w_3 W_i + w_4 S_i + w_5 B_i$$

where $w_1 + w_2 + w_3 + w_4 + w_5 = 1$

In contemplated embodiments, the equation can include performance characteristics specific to the resource, such as accuracy level, disposition (e.g., position or angle of camera or other sensor, RADAR, biometric sensor, etc.), a maximum volume level of a speaker, etc.

The device or component having the largest utility value ($U_i$) is preferred.

In various implementations, the second device—e.g., the networked-resource engine (408, 508, 608) evaluates utility value ($U_i$) at any of a variety of timings, such as:

Per Time: desired resource usage selected for a time period, even if open ended (e.g., indefinite end), accompanied by binding, express agreement, or contract for the resource corresponding to the subject timing; and Per Task: desired resource usage determined for a subject task, which can also be accompanied by binding or contract for the resource, for the subject task. In various embodiments, the task can be limited to performance in a set time period, or can be a task that repeats.

The determination 912 can involve consideration of resources of more than two devices, and balance the use of the resources across the devices.

If the second device (e.g., vehicle 10) at block 912 does not determine to request access to a resource of the first device, flow can proceed to block 906 where operation of the application is continued, with any resources already being used, such as resources native to the second device.

If the second device (e.g., vehicle 10) at block 912 determines to request access to a resource of the first device, at block 914, the second device sends a work request to the first device indicating the resource of the first device determined needed from the first device at block 912. The work request is prepared and sent using data from the resource announcement or networked-device table, such as an address of the networked, or resource, device, and an identifier corresponding to the resource to be used.

In some implementations, the work request includes parameters or requirements of use, such as a timing or amount of time by which the second device would like to use the resource, or characteristics of the resource sought to be used. Examples include a mode or level of the resource—e.g., zoom level of a camera, direction(s) or area(s) to which a camera or other sensor is or can be directed, or accuracy level of a positioning resource.

At block 806, the first device (e.g., mobile device 34) may determine whether a work request has been received from the second device (e.g., vehicle 10). At block 808, the first device receives the work request from the second device.

Also at block 808, the first device can revert to the second device with an acknowledgement message. The acknowledgement can include any of a variety of items, such as a confirmation that the resource is available, an identifier corresponding to the first, resource, device (whether the second device already has the identifier), and an identifier corresponding to the resource (whether the second device already has the identifier).

The operations 808 can also include the first device binding or reserving the resource for use by the second device. The reserving can represent a type of contract, or work-task agreement, or work-time agreement, by the first device, with itself and by the first device with the second device. The contract can be considered confirmed by transmission of the acknowledgement and/or by second device return acceptance or reply-acknowledgement of intent to use the bound/reserved resource.

In addition to identifying the subject resource, the contract or agreement can refer to usage characteristics, such as duration of the use, data bandwidth to be used and/or available for the use, and storage to be used and/or available for the use.

In various embodiments, the first device can still use the resource while the second device is using it. For instance, both devices can use a first-device camera—(1) the first device as a native resource, such as for a video conference being held by a vehicle passenger using the first device (e.g., phone 31), and (2) the second device as a virtual resource by way of the networked-resource client (e.g., vehicle client, or server/client, component 308), such as for autonomous driving of the second device At block 810, the first device fulfils the request, such as by providing to the second device the required access to the subject resource(s). As a basic example, the fulfillment can include sending to the second device (e.g., vehicle) data in real time from a subject sensor (e.g., camera) of the second device (e.g., user phone 31).

As also referenced, fulfillment can include providing access to a service or output resource of the first device. Example services include native-language processing (NPL), which may not be present at the first device (e.g. smartphone 31) and not the second device (e.g., vehicle), or general data processing abilities, which may be more robust or speedy at the first device. An example output resource is a speaker or display component of the first device.

At block 916, the second device receives and uses the access granted, to the first-device resource, in connection with a subject second-device application or applications. The operation can include monitoring the use and enforcing the use, such as by altering any parameters of the use, such as timing by which data is transferred to or from the resource or amount of data transferred.

At block 918, the second device determines whether the second device is done using the resource. If not, flow returns to block 916 for continued use of the resource in operation of the subject second-device application(s). If so, flow proceeds to block 920 whereat the second device terminates use of the first-device resource. The termination can include or be accompanied by providing a termination message to the first device.

At block 812, the first device terminates access to the subject first-device resource and/or releases the resource from being bound for or used by the second device. Termination is in some implementations performed in response to receiving the termination message from the second device. And the termination can include providing a termination conformation to the first device, whether the first device previously provided the termination message.

The processes 800, 900 can end 813, 919 or any one or more operations of the processes 800, 900 can be performed again.

VIII. Select Advantages

Many of the benefits and advantages of the present technology are described above. The present section restates some of those and references some others. The benefits described are not exhaustive of the benefits of the present technology.

The present technology allows an application running on a device, such as an automobile, to use a resource of another device, such as a USB device, effectively providing the aftermarket resource in a virtual manner to the first device. Or an application running on a mobile, personal, or aftermarket electronic or computing device can use a resource of another device, such as the automobile computing system, effectively providing the automobile resource in a virtual manner to the first device.

In various embodiments, little to no modifications are needed to any of the devices, such as no hardware modification to either device being required to implement the technology. In various implementations, no operating system (O/S) modifications are needed to any device, or at least a primary device such as an automobile computing system.

The technology allows use of numerous applications—e.g., thousands from online stores—that the devices were not alone configured to use, or use more fully (e.g., more features).

The networked-device engines and/or dynamic-programming language (DPL) arrangement(s) facilitate what can be referred to as device arbitration. With mobile devices 31, 32, 33, though having their own processors and operating systems, behaving as respective peripherals of the vehicle system 10, the networked devices (e.g., vehicle system 20 and plug-in system 220) inter-operate seamlessly. In some implementations, the seamless operation is executed in a manner substantially similar (e.g., processing speed, resource use, etc.) as if the device borrowing, or, virtualizing, the resource, had the resource natively.

The technology presents a mechanism to share hardware/software resources among different devices in and including an automobile or other vehicle, such as a central stack module (CSM) device of the vehicle, a plug-in or mass-storage device, a dongle (e.g., gadget dongle), and a consumer electronic device.

A device can use high-quality resources, such as sensors, or resources of a higher quality than the device has natively, at much less cost than would be required to retrofit the device with such resource.

With the proliferation of aftermarket and consumer electronic devices, the technology allows leveraging of numerous non-vehicle computing resources at the vehicle. Similarly, rich resources, or I/O functionalities, of the vehicle, can be made available to such AM of CE devices.

Other business-related benefits include: cost reduction for aftermarket, personal, or mobile electronic or computing devices, improved in-vehicle user experience, and provision for vehicle systems with elasticity of resources, as compared to the conventional scenario in which resources of the vehicle are static, limited to existing resources native to the vehicle.

IX. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

References herein to how a feature is arranged can refer to, but are not limited to, how the feature is positioned with respect to other features. References herein to how a feature is configured can refer to, but are not limited to, how the feature is sized, how the feature is shaped, and/or material of the feature. For simplicity, the term configured can be used to refer to both the configuration and arrangement described above in this paragraph.

References herein indicating direction are not made in limiting senses. For example, references to upper, lower, top, bottom, or lateral, are not provided to limit the manner in which the technology of the present disclosure can be implemented. While an upper surface may be referenced, for example, the referenced surface need not be vertically upward, in a design, manufacture, or operating reference frame, or above any other particular component, and can be aside of some or all components in design, manufacture and/or operation instead, depending on the orientation used in the particular application.

Directional references are provided herein mostly for ease of description and for simplified description of the example drawings, and the thermal-management systems described can be implemented in any of a wide variety of orientations. References herein indicating direction are not made in limiting senses. For example, references to upper, lower, top, bottom, or lateral, are not provided to limit the manner in which the technology of the present disclosure can be implemented. While an upper surface is referenced, for example, the referenced surface can, but need not be vertically upward, or atop, in a design, manufacturing, or operating reference frame. The surface can in various embodiments be aside or below other components of the system instead, for instance.

Any component described or shown in the figures as a single item can be replaced by multiple such items configured to perform the functions of the single item described. Likewise, any multiple items can be replaced by a single item configured to perform the functions of the multiple items described.

Variations, modifications, and combinations may be made to the above-described embodiments without departing from the scope of the claims. All such variations, modifications, and combinations are included herein by the scope of this disclosure and the following claims.

What is claimed is:

1. A transportation-vehicle system, comprising:
   a processing hardware unit; and
   a non-transitory computer-readable storage device comprising code that, when executed by the processing hardware unit, causes the processing hardware unit to:
      receive, from a mobile-electronic device, a mobile-device resource profile indicating a mobile-device resource;
      determine whether to use the mobile-device resource, comprising performing a weighted utility function comparing multiple optional resources, wherein a pre-determined weight is assigned to each of a plurality of characteristics of the multiple optional resources being compared, and a weighted utility value is determined for each of the optional resources based on the plurality characteristics of the optional resource and corresponding pre-determined weights; and
      utilize, in response to determining to use the mobile-device resource, the mobile-device resource in operation of the transportation-vehicle system.

2. The transportation-vehicle system of claim 1 being part of, or specially configured for implementation as part of, a vehicle of transportation that does not include a resource analogous to the mobile-device resource.

3. The transportation-vehicle system of claim 1 wherein:
   the code is configured to cause the processing hardware unit to, in response to determining to use the mobile-device resource of the mobile-electronic device, send a work request to the mobile-electronic device requesting agreement for the transportation-vehicle system to use the mobile-device resource;
   the code is configured to cause the processing hardware unit to receive a commitment communication from the mobile-electronic device responding to the work request; and
   utilizing the mobile-device resource of the mobile-electronic device is performed in response to receiving the commitment communication.

4. The transportation-vehicle system of claim 1 wherein:
   the code is configured to cause the processing hardware unit to, based on the mobile-device resource profile, generate or modify a networked-device table outlining one or more available resources of one or more devices networked with the transportation-vehicle system;
   at least one of the multiple optional resources is represented in the networked-device table; and
   at least one of the multiple optional resources is a system resource, the system resource being a resource of the transportation-vehicle system or part of an apparatus comprising the transportation-vehicle system.

5. The transportation-vehicle system of claim 1 wherein:
   the code comprises an application executing or to be executed at the transportation-vehicle system; and
   utilizing the mobile-device resource of the mobile-electronic device in operation of the transportation-vehicle system includes utilizing the mobile-device resource in execution of the application at the transportation-vehicle system.

6. The transportation-vehicle system of claim 1 wherein the code comprises a networked-device client configured to communicate with a networked-device server of the mobile-electronic device for transmitting, between the transportation-vehicle system and the mobile-electronic device, data related to use of the mobile-device resource in operation of the transportation-vehicle system.

7. The transportation-vehicle system of claim 1 wherein the mobile-device resource comprises a mobile-device sensor.

8. The transportation-vehicle system of claim 7 wherein the sensor is selected from a list consisting of: a camera, an accelerometer, an altimeter, a bio-metric sensor, RADAR, LiDAR, position- or pose-determination sensor, a speed sensor, a height sensor, a weight or payload sensor, and a weather-related sensor.

9. The transportation-vehicle system of claim 1 wherein the mobile-device resource comprises a mobile-device service.

10. The transportation-vehicle system of claim 9 wherein utilizing the mobile-device resource of the mobile-electronic device in operation of the transportation-vehicle system comprises sending a system message to the mobile-electronic device for processing using the mobile-device service.

11. The transportation-vehicle system of claim 9 wherein the mobile-device resource comprises components configured to provide a natural-language-processing service.

12. The transportation-vehicle system of claim 1 wherein:
   the mobile-device resource comprises a mobile-device output component; and
   utilizing the mobile-device resource of the mobile-electronic device in operation of the transportation-vehicle system comprises sending a system message to the mobile-electronic device for output from the mobile-device output component.

13. The transportation-vehicle system of claim 1 wherein:
   the weighted utility function is configured to determine a utility value ($U_i$) for each optional resource according to:

$$U_i = w_1 C_i + w_2 F_i + w_3 W_i + w_4 S_i + w_5 B_i;$$

the relevant characteristics comprise:
   C represents a processing factor of a host device, hosting the optional resource;

F represents a memory factor of the host device;

W represents a communication or device-device connection characteristic associated with the host device;

S represents an identifier for the optional resource; and

B represents a power characteristic of the host device; and w1, w2, w3, w4, w5 represent respective weights pre-determined for the relevant characteristics.

14. The transportation-vehicle system of claim 1 wherein the plurality of characteristics includes at least one characteristic selected from a group consisting of:

a processing factor (C) of a host device, hosting the optional resource;

a memory factor (F) of the host device;

a communication or device-device connection characteristic (W) associated with the host device;

an identifier for the optional resource (S); and a power characteristic (B) of the host device.

15. A non-transitory computer-readable storage device, for implementation at a vehicle of transportation, comprising code that, when executed by a processing hardware unit, causes the processing hardware unit to:

receive, from a mobile-electronic device, a mobile-device resource profile indicating a mobile-device resource;

determine whether to use a mobile-device resource of the mobile-electronic device, comprising performing a weighted utility function comparing multiple optional resources, wherein a pre-determined weight is assigned to each of a plurality of characteristics of the multiple optional resources being compared, and a weighted utility value is determined for each of the optional resources based on plurality of characteristics of the resource and corresponding pre-determined weights; and utilize, in response to determining to use the mobile-device resource, the mobile-device resource in operation of the vehicle.

16. The non-transitory computer-readable storage device of claim 15 wherein determining whether to use the mobile-device resource comprises performing a weighted utility function comparing utility of multiple optional resources.

17. The non-transitory computer-readable storage device of claim 15 wherein:

the weighted utility function is configured to determine a utility value ($U_i$) for each optional resource according to:

$$U_i = w_1 C_i + w_2 F_i + w_3 W_i + w_4 S_i + w_5 B_i;$$

the relevant characteristics comprise:

C represents a processing factor of a host device, hosting the optional resource;

F represents a memory factor of the host device;

W represents a communication or device-device connection characteristic associated with the host device;

S represents an identifier for the optional resource; and

B represents a power characteristic of the host device; and w1, w2, w3, w4, w5 represent respective weights pre-determined for the relevant characteristics.

18. A mobile-electronic device, comprising:

a processing hardware unit; and a non-transitory computer-readable storage device comprising code that, when executed by the processing hardware unit, causes the processing hardware unit to:

receive, from a transportation-vehicle system, a vehicle resource profile indicating a vehicle resource;

determine whether to use the vehicle resource, comprising performing a weighted utility function comparing multiple optional resources, wherein a pre-determined weight is assigned to each of a plurality of characteristics of the multiple optional resources being compared, and a weighted utility value is determined for each of the optional resources based on the plurality of characteristics of the resource and corresponding pre-determined weights; and utilize, in response to determining to use the vehicle resource, the vehicle resource of the transportation-vehicle system in operation of the mobile-electronic device.

19. The mobile-electronic device of claim 18 wherein determining whether to use the vehicle resource comprises performing a weighted utility function comparing utility of multiple optional resources.

20. The mobile-electronic device of claim 18 wherein:

the weighted utility function is configured to determine a utility value ($U_i$) for each optional resource according to:

$$U_i = w_1 C_i + w_2 F_i + w_3 W_i + w_4 S_i + w_5 B_i;$$

the relevant characteristics comprise:

C represents a processing factor of a host device, hosting the optional resource;

F represents a memory factor of the host device;

W represents a communication or device-device connection characteristic associated with the host device;

S represents an identifier for the subject resource; and

B represents a power characteristic of the host device; and w1, w2, w3, w4, w5 represent respective weights pre-determined for the relevant characteristics.

* * * * *